United States Patent
Ma et al.

(10) Patent No.: US 10,977,829 B2
(45) Date of Patent: Apr. 13, 2021

(54) DEPTH CAMERA CALIBRATION DEVICE AND METHOD THEREOF

(71) Applicant: INDUSTRIAL TECHNOLOGY RESEARCH INSTITUTE, Hsinchu (TW)

(72) Inventors: Tien-Yan Ma, New Taipei (TW); Te-Mei Wang, Hsinchu (TW); Ping-Chang Shih, Yuanlin (TW)

(73) Assignee: INDUSTRIAL TECHNOLOGY RESEARCH INSTITUTE, Hsinchu (TW)

( * ) Notice: Subject to any disclaimer, the term of this patent is extended or adjusted under 35 U.S.C. 154(b) by 118 days.

(21) Appl. No.: 16/233,262

(22) Filed: Dec. 27, 2018

(65) Prior Publication Data

US 2020/0184684 A1 Jun. 11, 2020

(30) Foreign Application Priority Data

Dec. 7, 2018 (TW) .................. 107144084

(51) Int. Cl.
*G06T 7/80* (2017.01)
*G06T 7/55* (2017.01)
(Continued)

(52) U.S. Cl.
CPC .................. *G06T 7/80* (2017.01); *G06T 7/12* (2017.01); *G06T 7/174* (2017.01); *G06T 7/55* (2017.01);
(Continued)

(58) Field of Classification Search
CPC .... G06T 7/80; G06T 7/55; G06T 7/12; G06T 7/174; G06T 2207/20132; G06T 2207/10028
(Continued)

(56) References Cited

U.S. PATENT DOCUMENTS 9,774,837 B2    9/2017   Chang et al.
9,858,684 B2 *   1/2018   Kim ..................... H04N 13/254
(Continued)

FOREIGN PATENT DOCUMENTS

CN    106651794 A    5/2017
CN    107133989 A    9/2017
(Continued)

OTHER PUBLICATIONS

Zhengyou Zhang, A flexible new technique for camera calibration, Technical Report, MSR-TR-98-71, 1998, Microsoft Research Microsoft Corporation.
(Continued)

*Primary Examiner* — Jerome Grant, II
(74) *Attorney, Agent, or Firm* — Locke Lord LLP; Tim Tingkang Xia, Esq.

(57) ABSTRACT

A depth camera calibration device and a method thereof are provided. The method comprises: disabling a projection function of a camera and photographing surface planes to obtain a first image; enabling the projection function of the camera and photographing the surface planes to obtain a second image, and a positional relationship between the camera and a calibration plate assembly remaining unchanged when obtaining the first image and the second image; and obtaining parameters of the camera by cropping an image boundary, calculating positions of characteristic points, reading a projection pattern, calculating positions of corresponding points and excluding abnormal points according to the first image and the second image.

13 Claims, 14 Drawing Sheets

(51) Int. Cl.
*G06T 7/12* (2017.01)
*G06T 7/174* (2017.01)

(52) U.S. Cl.
CPC ............ *G06T 2207/10028* (2013.01); *G06T 2207/20132* (2013.01)

(58) Field of Classification Search
USPC ........................................................ 382/154
See application file for complete search history.

(56) References Cited

U.S. PATENT DOCUMENTS

| | | | |
|---|---|---|---|
| 9,986,233 B1* | 5/2018 | Curlander | B64D 47/08 |
| 2009/0073259 A1 | 3/2009 | Hernandez et al. | |
| 2011/0254923 A1* | 10/2011 | Choi | H04N 13/207 |
| | | | 348/46 |
| 2012/0287247 A1 | 11/2012 | Stenger et al. | |
| 2014/0168378 A1* | 6/2014 | Hall | G06F 3/0425 |
| | | | 348/47 |
| 2015/0189267 A1 | 7/2015 | Kaji | |
| 2016/0073101 A1* | 3/2016 | Keaffaber | H04N 5/247 |
| | | | 348/187 |
| 2017/0094256 A1* | 3/2017 | Bronstein | G01B 11/2545 |
| 2017/0270654 A1* | 9/2017 | Eldar | G06T 7/80 |
| 2017/0287169 A1 | 10/2017 | Garcia | |
| 2017/0294009 A1 | 10/2017 | Pollard | |
| 2017/0372492 A1* | 12/2017 | Doganis | G06T 7/70 |
| 2019/0132584 A1* | 5/2019 | Yu | H04N 17/002 |
| 2019/0149788 A1* | 5/2019 | Liou | G01B 11/2504 |
| | | | 348/189 |
| 2019/0327454 A1* | 10/2019 | Waldl | G06T 7/80 |
| 2020/0007843 A1* | 1/2020 | Zhang | H04N 13/128 |

FOREIGN PATENT DOCUMENTS

| | | |
|---|---|---|
| CN | 107730554 A | 2/2018 |
| TW | 201233144 A | 8/2012 |
| TW | I530909 B | 4/2016 |
| TW | 201621811 A | 6/2016 |
| TW | 201719579 A | 6/2017 |
| TW | I604414 B | 11/2017 |
| TW | I622960 B | 5/2018 |

OTHER PUBLICATIONS

Huafen Luo et al., A simple calibration procedure for structured light system, Optics and Lasers in Engineering, 2014, vol. 57, 6-12.
Minh Vo et al., Advanced geometric camera calibration for machine vision, Optical Engineering, 2011, vol. 50(11).
Andreas Geiger et al., Automatic camera and range sensor calibration using a single shot, IEEE International Conference on Robotics and Automation, 2012.
Ankur Datta et al., Accurate camera calibration using iterative refinement of control points, IEEE 12th International Conference on Computer Vision Workshops, ICCV Workshops, 2009.
Intellectual Property Office Ministry of Economic Affairs, R.O.C., "Taiwan Notice of Allowance and Search Report for TW Appln No. 107144084", Taiwan, Oct. 16, 2019.

* cited by examiner

DEPTH CAMERA CALIBRATION DEVICE AND METHOD THEREOF

CROSS-REFERENCE TO RELATED APPLICATIONS

This non-provisional application claims priority under 35 U.S.C. § 119(a) on Patent Application No(s). 107144084 filed in Taiwan on Dec. 7, 2018, the entire contents of which are hereby incorporated by reference.

BACKGROUND

1. Technical Field

This disclosure relates to a calibration device and a calibration method for an image capturing device, especially for a calibration device for a structured-light depth camera and a method thereof.

2. Related Art

An error of a depth camera causing from an assembly process can deteriorate a quality of a depth image. In order to making a high-quality depth image of the depth camera, the depth camera must be calibrated before leaving from a factory and write accurate intrinsic parameters, accurate distortion coefficients and accurate extrinsic parameters into a camera firmware.

A conventional calibration device of a structured-light depth camera based on a random pattern includes an optical platform, a mobile platform and a calibration board. Except that the conventional calibration device has higher installation and the maintenance costs, a positional relationship between the structured-light depth camera and the calibration board needs to be dynamically adjusted by the mobile platform when the conventional calibration device calibrates the structured-light depth camera, so it takes longer time to calibrate the structured light-depth camera to affect an efficiency of production line.

Therefore, there is indeed a need for an improved camera calibration device and a method thereof, which can at least improve the above problems.

SUMMARY

According to one or more embodiment of this disclosure, a depth camera calibration device is provided. The depth camera calibration device is configured to calibrate a structured-light depth camera, and the depth camera calibration device comprises a calibration board assembly and a processor. The calibration board assembly includes a plurality of surface planes, each of the surface planes is provided with a plurality of closed patterns, and a center of mass of each of the closed pattern is within a range enclosed by the respective closed pattern. The surface planes are non-coplanar and non-parallel to each other, and the surface planes are configured to receive a projection pattern projected by the structured-light depth camera. The processor is configured to electrically connected to the structured-light depth camera, and obtains an intrinsic parameters set, a distortion coefficients set and extrinsic parameters of the structured-light depth camera by cropping an image boundary automatically, calculating a plurality of positions of characteristic points, reading the projection pattern, calculating a plurality of positions of corresponding points and excluding abnormal points.

According to one or more embodiment of this disclosure, a depth camera calibration method is provided. The depth camera calibration method is configured to calibrate a structured-light depth camera and performed by a depth camera calibration device, the depth camera calibration device comprises a calibration board assembly and a processor, the calibration board assembly includes a plurality of surface planes, each of the surface planes is provided with a plurality of closed patterns, a center of mass of each of the closed patterns is in a range enclosed by the respective closed pattern, the surface planes are non-coplanar and non-parallel to each other, and the depth camera calibration method comprises: disabling a projection function of the structured-light depth camera and photographing the surface planes to obtain a first image by an image capturing element of the structured-light depth camera, with the first image having the closed patterns; enabling the projection function of the structured-light depth camera and photographing the surface planes to obtain a second image by the image capturing element, with the second image having the closed patterns and a projection pattern, and a positional relationship between the structured-light depth camera and the calibration board assembly remaining unchanged when the image capturing element obtains the first image and the second image; and obtaining an intrinsic parameters set, a distortion coefficients set and extrinsic parameters of the structured-light depth camera by cropping an image boundary automatically, calculating a plurality of positions of characteristic points, reading the projection pattern, calculating a plurality of positions of corresponding points and excluding abnormal points according to the first image and the second image by the processor.

BRIEF DESCRIPTION OF THE DRAWINGS

The present disclosure will become more fully understood from the detailed description given herein below and the accompanying drawings which are given by way of illustration only and thus are not limitative of the present disclosure and wherein.

DETAILED DESCRIPTION

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawings.

Figure 1:
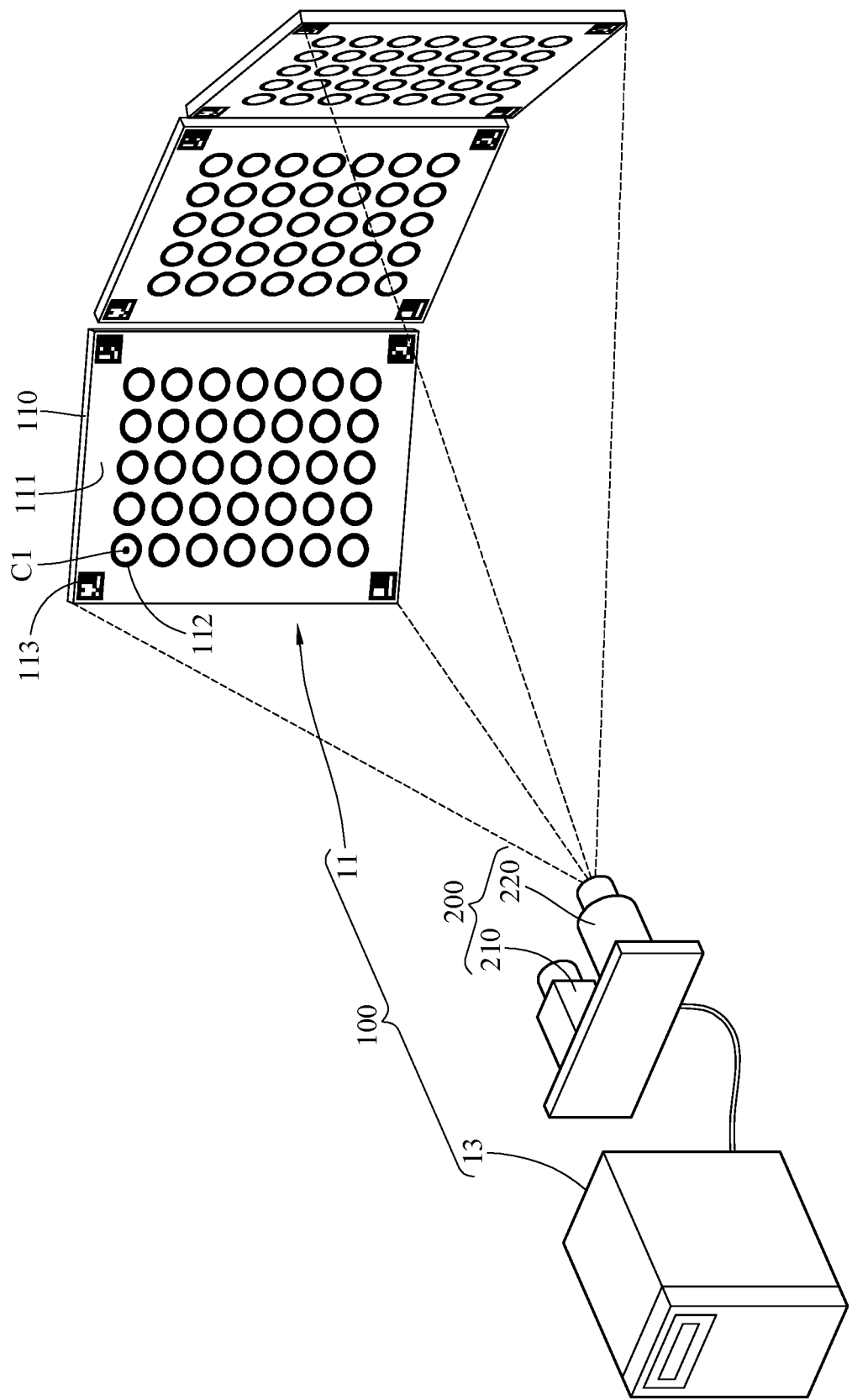
FIG. 1 is a schematic view of a depth camera calibration device according to a first embodiment of the present disclosure.

Please refer to FIG. 1 which is a schematic view of a depth camera calibration device according to one embodiment of the present disclosure. The depth camera calibration device 100 is configured to calibrate a structured-light depth camera 200, the structured-light depth camera 200 includes an imaging capturing element 210 and a projection element 220, and the structured-light depth camera 200 is a modular structure. The depth camera calibration device 100 includes a calibration board assembly 11 and a processor 13, and the processor 13 can be used to calculate an intrinsic parameters set, a distortion coefficients set and extrinsic parameters of the structured-light depth camera 200. Wherein the intrinsic parameters set of the structured-light depth camera 200 includes intrinsic parameters of the image capturing element 210 and intrinsic parameters of the projection element 220, the distortion coefficients set of the structured-light depth camera 200 includes distortion coefficients of the image capturing element 210 and distortion coefficients of the projection element 220. In this embodiment, the calibration board assembly 11 includes a plurality of calibration boards 110, each of the calibration boards 110 has a surface plane 111, each of the surface planes 111 is provided with a plurality of closed patterns 112 and four corners of each of the surface planes 111 are marked with four coded marks 113 respectively. In this embodiment, each of the closed patterns 112 is an annular pattern and intervals of the closed patterns 112 are the same. A center of mass C1 of each of the closed patterns 112 is within a range enclosed by the respective closed pattern 112, and the centers of mass C1 of each of the surface planes 111 can be set as a plurality of characteristic points of the surface plane 111, and each of the characteristic points has a characteristic point coordinate.

The surface planes 111 are non-coplanar and non-parallel to each other, and an angle between two planes extended from any two of the surface planes 111 is not 0 degree or 180 degrees. In this embodiment, adjacent calibration boards 110 do not overlap with each other and intervals between the calibration boards 110 are equidistant. In other embodiments, the intervals between the calibration boards 110 may not be equidistant or the adjacent calibration boards 110 can at least partially overlap with each other. When the depth camera calibration device 100 performs a calibration process, a positional relationship between the structured-light depth camera 200 and the calibration board assembly 11 remains unchanged, and the surface planes 111 have different orientations relative to an image capturing surface of the image capturing element 210 respectively, wherein physical quantities of the orientation include a relative distance and a relative angle.

The projection element 220 of the structured-light depth camera 200 can be an optical projection device or a digital projection device, and the surface planes 111 receive a projection pattern projected by the projection element 220. The image capturing element 210 photographs the surface planes 111 on which the projection pattern has been projected, wherein the projection pattern may be, for example, a random pattern or a random number pattern.

The processor 13 of the depth camera calibration device 100 can be implemented, for example, by a microchip, a circuit block in a chip, a firmware, a circuit board provided with electronic components and conductive wires, a storage medium storing a code, a computer system, a server or a software. The processor 13 is electrically connected to the structured-light depth camera 200. The processor 13 stores a configuration file, and the configuration file includes a resolution of the image capturing element 210, the projection pattern projected by the projection element 220, sizes of the calibration boards 110, the characteristic point coordinate of each of the characteristic points, and the processor 13 can be used to read the configuration file. In other embodiments, the resolution of the image capturing element 210, the sizes of the calibration boards 110, a distance between any two of the characteristic points, and the characteristic point coordinate of each of characteristic points may also be directly inputted to the processor 13 by a user.

Figure 2:
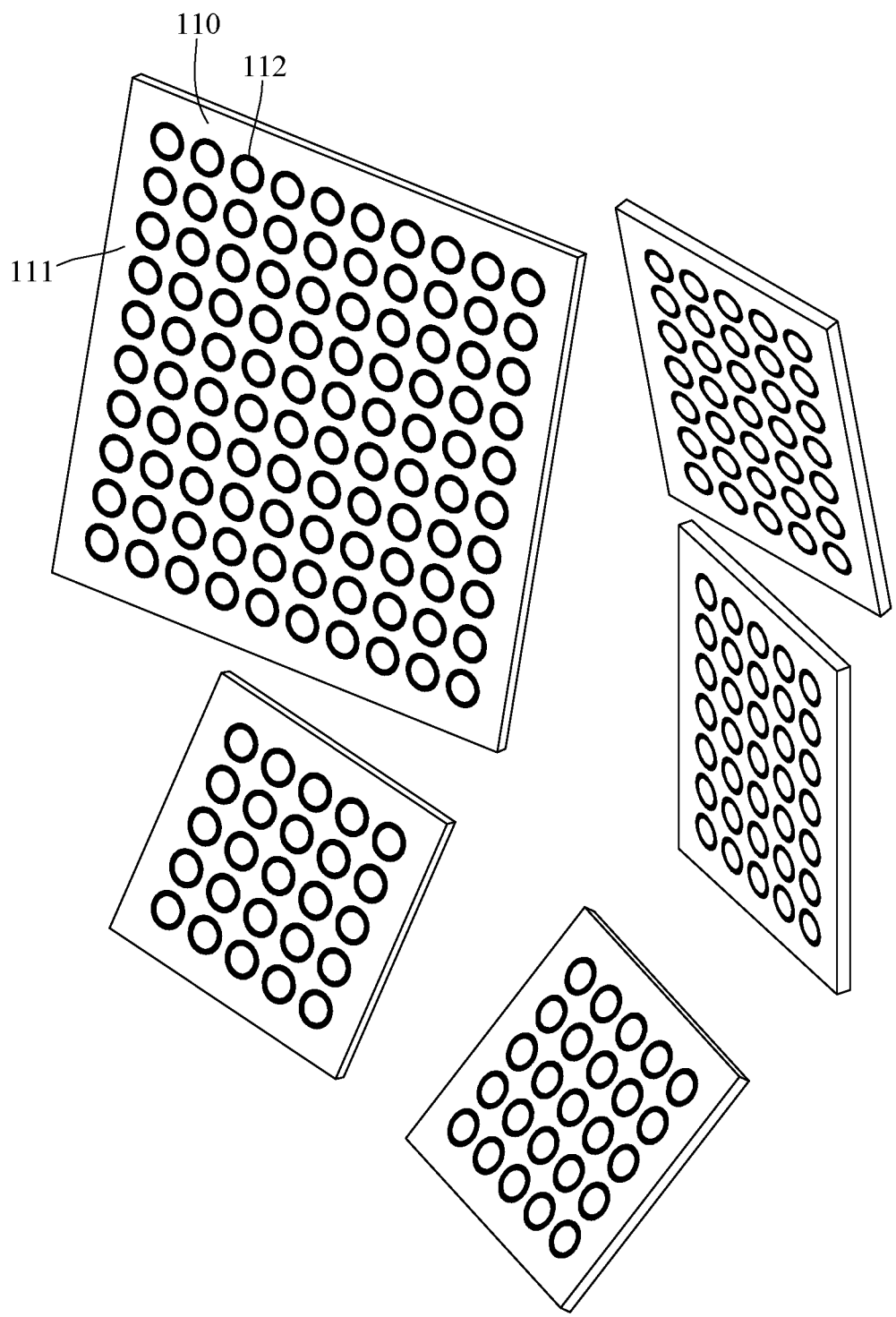
FIGS. 2 to 4 are schematic views of configurations of calibration board assemblies according to several embodiments of the present disclosure.
Figure 3:
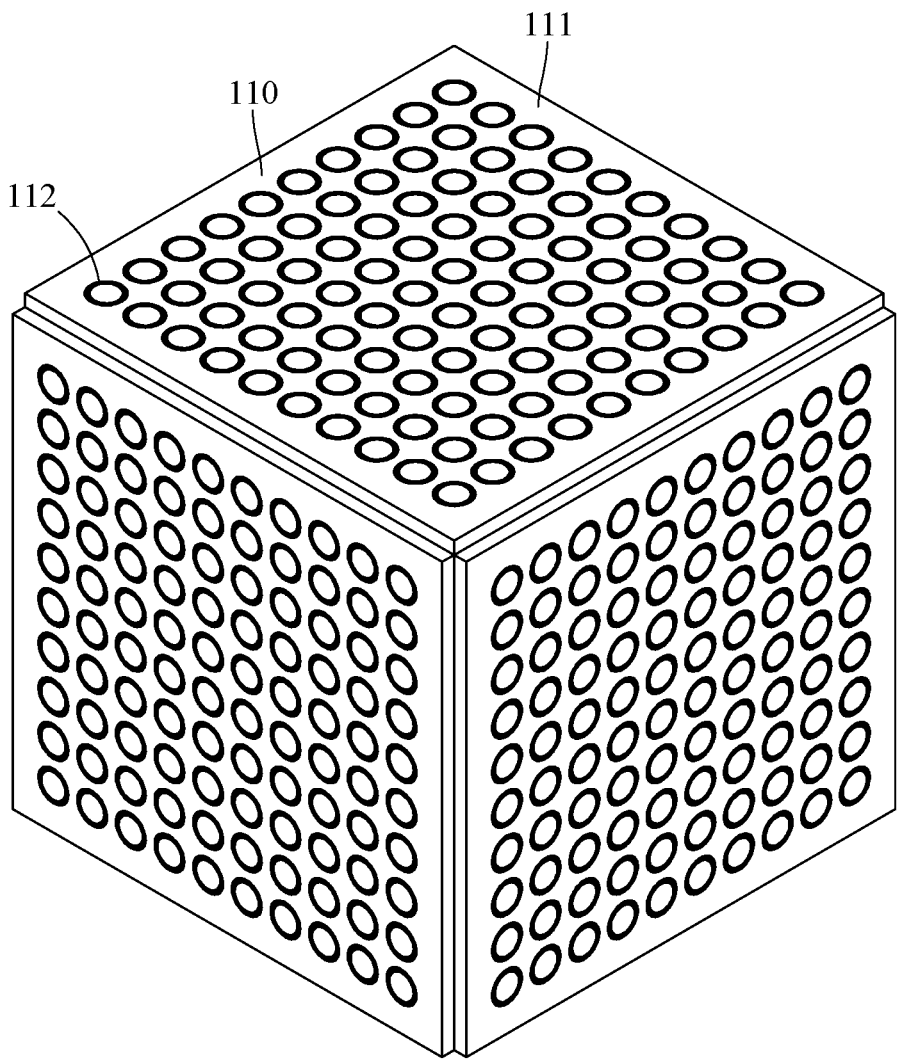
Figure 4:
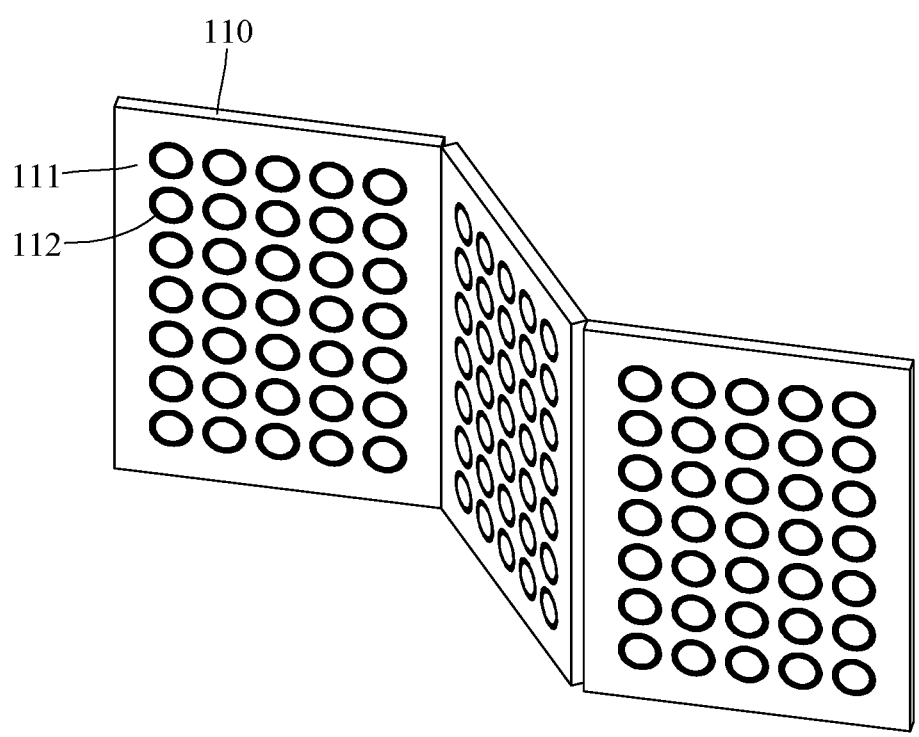

FIGS. 2 to 4 are schematic views of configurations of calibration board assemblies according to several embodiments of the present disclosure. As shown in FIG. 2, the calibration boards 110 have different sizes respectively, and the surface planes 111 of the calibration boards 110 have different orientations relative to the structured-light depth camera 200 respectively. As shown in FIG. 3, the calibration boards 110 are grouped into a cube, and an angle between the planes extended from any two of the surface planes 111 is greater than 180 degrees. As shown in FIG. 4, the angle between the planes extended from any two of the surface planes 111 can be greater or less than 180 degrees.

Figure 5A:
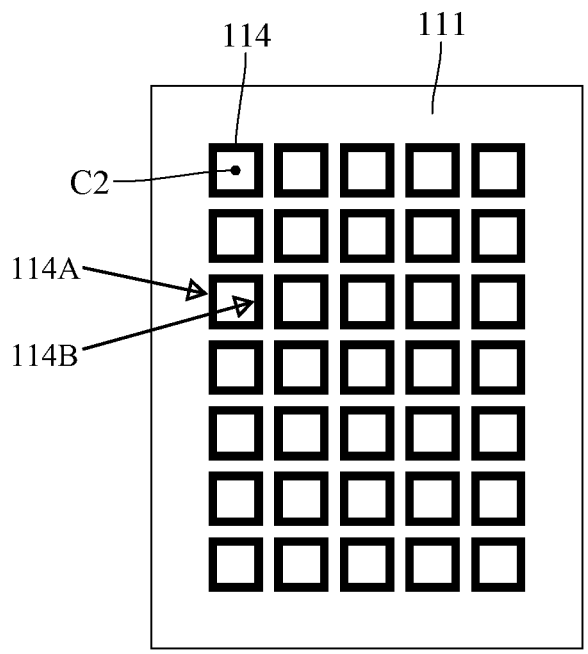
FIGS. 5A to 5C are schematic views of closed patterns according to several embodiments of the present disclosure.
Figure 5B:
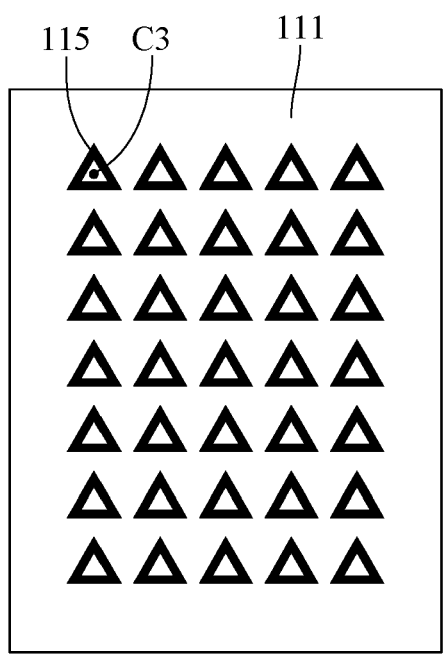
Figure 5C:
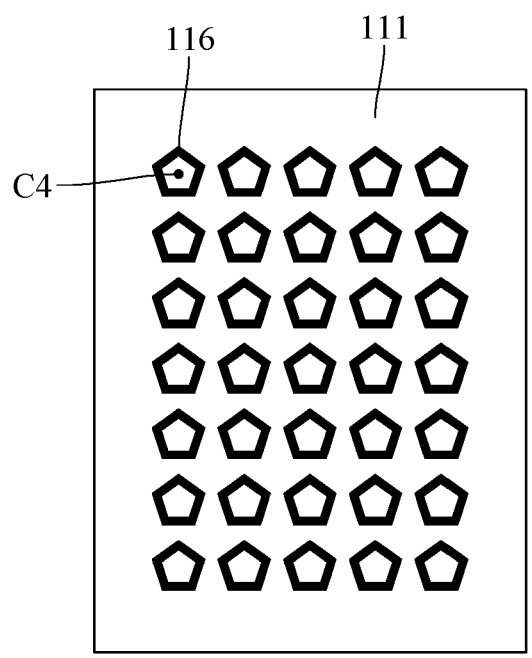

FIGS. 5A to 5C are schematic views of closed patterns according to several embodiments of the present disclosure. As shown in FIG. 5A to 5C, the closed pattern of each of the surface planes 111 may be replaced with a regular polygonal pattern except the annular pattern described in the previous embodiment, and a center of mass of the regular polygonal pattern is within a range enclosed by the regular polygonal pattern. As shown in FIG. 5A, each of the surface planes 111 is provided with a plurality of square closed patterns 114. The intervals of the square closed patterns 114 are equidistant, and a center of mass C2 of each of the square closed patterns 114 is within a range enclosed by the square closed pattern 114. Specifically, as shown in FIG. 5A, each of the square closed patterns 114 includes an outer contour 114A and an inner contour 114B, and the center of mass C2 of each of the square closed patterns 114 is within a range enclosed by the inner contour 114B. As shown in FIG. 5B, each of the surface planes 111 is provided with a plurality of regular triangular closed patterns 115, the intervals of the regular triangular closed patterns 115 are equidistant, and a center of mass C3 of each of the regular triangular closed patterns 115 is within a range enclosed by the regular triangular closed pattern 115. As shown in FIG. 5C, each of the surface planes 111 is provided a plurality of regular pentagonal closed patterns 116, the intervals of the regular pentagonal closed patterns 116 are equidistant, and a center of mass C4 of each of the regular pentagonal closed pattern 116 is within a range enclosed by the regular pentagonal closed pattern 116.

Figure 6:
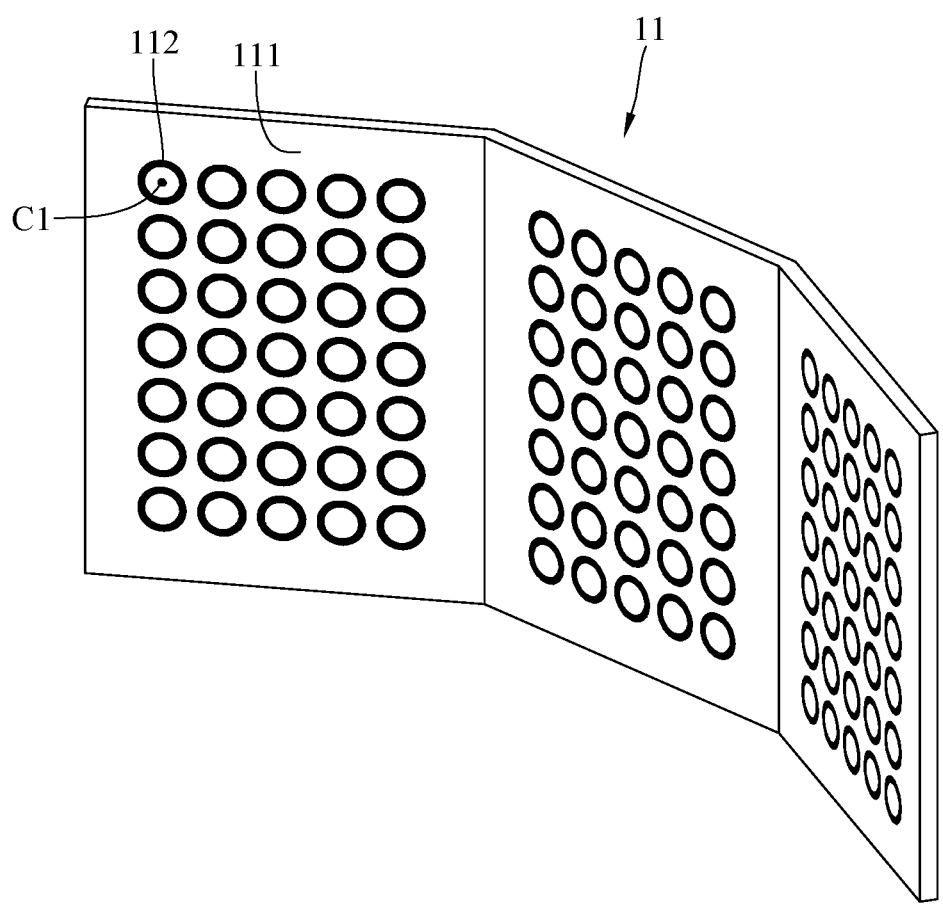
FIG. 6 is a schematic view of a depth camera calibration device according to another embodiment of the present disclosure.

FIG. 6 is a schematic view of a depth camera calibration device according to another embodiment of the present disclosure. As shown in FIG. 6, the calibration board assembly 111 may be a one-piece structure, the surface planes 111 are non-coplanar and non-parallel to each other, and an angle between two planes extended from any two of the surface planes 111 is not 0 degree or 180 degrees. The closed pattern 112 of each of the surface planes 111 is a closed annular pattern, and the center of mass C1 of the closed annular pattern is within a range enclosed by the closed annular pattern. In other embodiments, calibration patterns of the calibration board assembly 11 having a one-piece structure can be replaced with regular polygon patterns.

Figure 7:
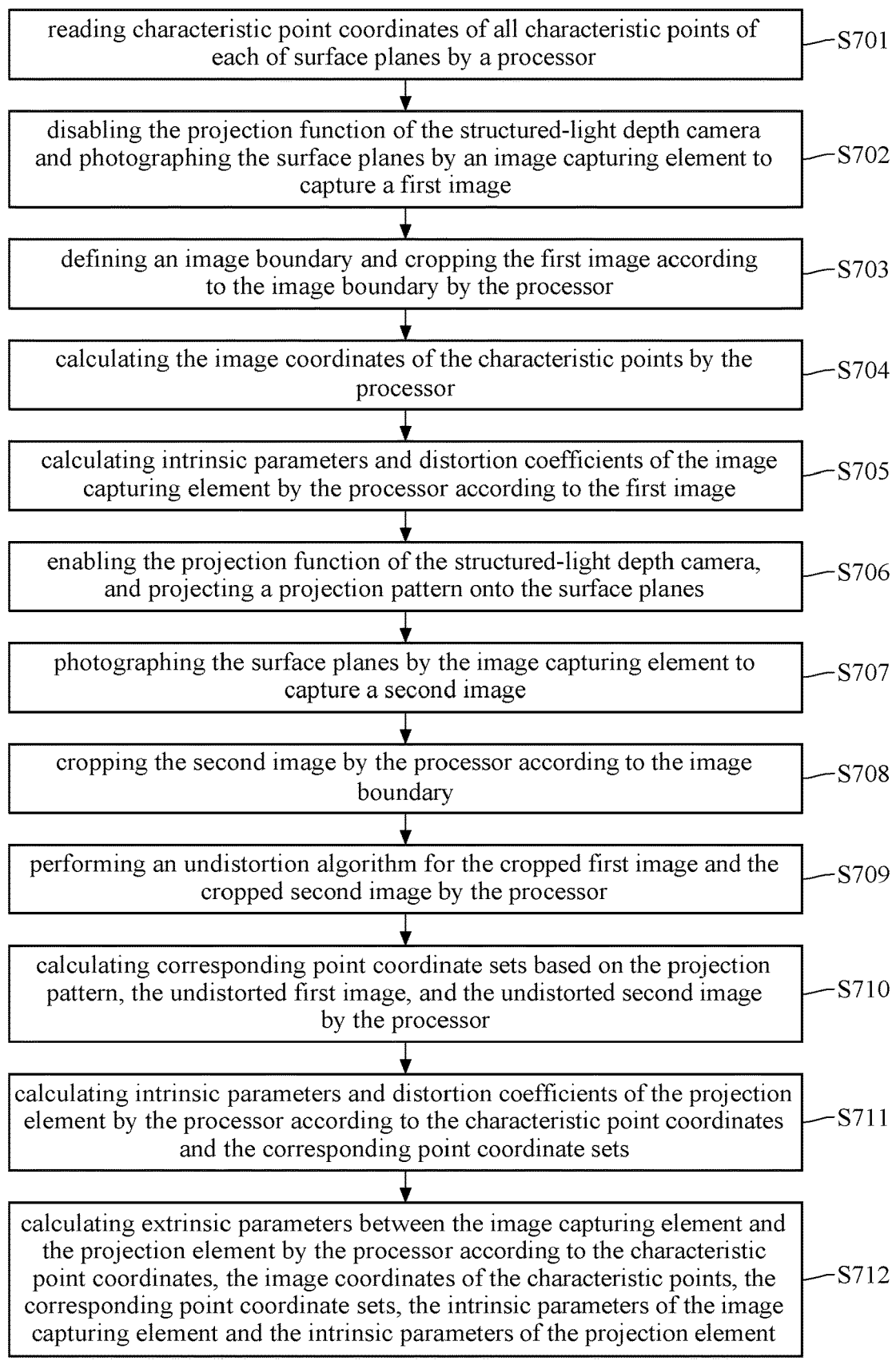
FIG. 7 is a flowchart of a depth camera calibration method according to one embodiment of the present disclosure.
Figure 8A:
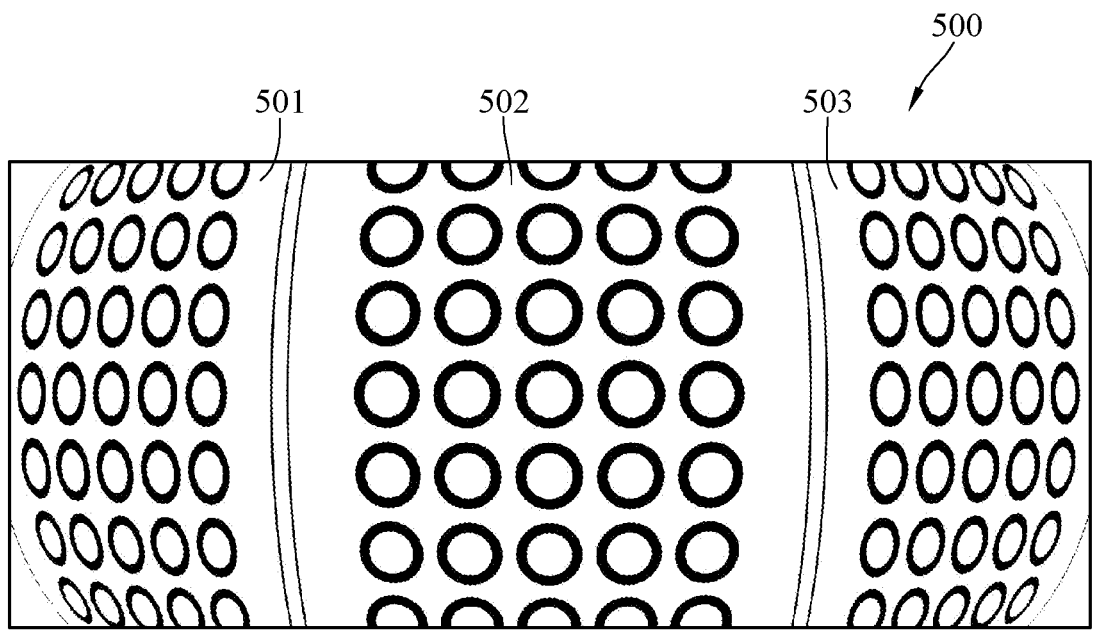
FIGS. 8A and 8B are schematic views of images of surface planes photographed by a structured-light depth camera without performing an undistortion algorithm according to one embodiment of the present disclosure.
Figure 8B:
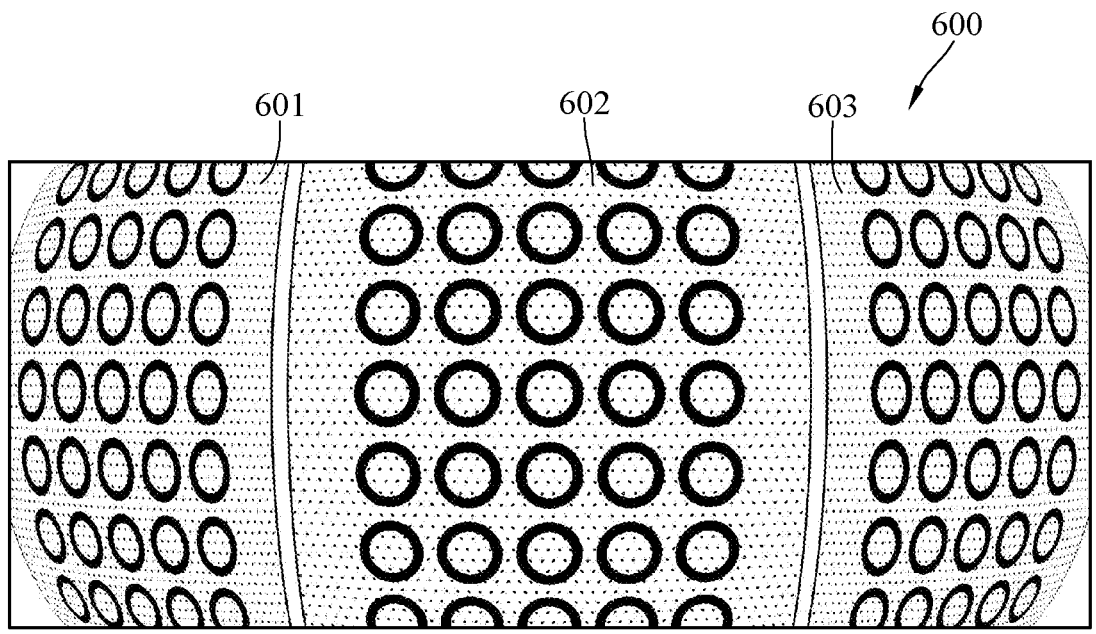

FIG. 7 is a flowchart of a depth camera calibration method according to one embodiment of the present disclosure. FIGS. 8A and 8B are schematic views of images of surface planes photographed by a structured-light depth camera without performing an undistortion algorithm according to one embodiment of the present disclosure. Refer to FIG. 7, FIG. 8A and FIG. 8B together, the depth camera calibration method shown in FIG. 7 can be performed by the depth camera calibration device 100 shown in FIG. 1. Step S701 is reading a resolution of the image capturing element 210 and characteristic point coordinates of all characteristic points of each of the surface planes 111 by the processor 13, wherein each of the characteristic points is a center of mass of a closed pattern. Step S702 is disabling the projection function of the structured-light depth camera 200 and photographing the surface planes 111 by the image capturing element 210 of the structured-light depth camera 200 to capture a first image 500. The first image 500 has closed patterns, and the first image 500 includes a first orientation actual image 501, a second orientation actual image 502, and a third orientation actual image 503. The first orientation actual image 501, the second orientation actual image 502 and the third orientation actual image 503 have different orientations respectively. Since the processor 13 has not performed an undistortion algorithm, annular patterns of the first orientation actual image 501, annular patterns of the second orientation actual image 502, and annular patterns of the third orientation actual image 503 are distorted or deformed compared to actual annular patterns of the calibration boards 110.

Step S703 is defining an image boundary and cropping the first image 500 according to the image boundary by the processor 103.

Step S704 is calculating the image coordinates of the characteristic points of the first orientation actual image 501, the second orientation actual image 502 and the third orientation actual image 503 by the processor 13 according to a characteristic point detecting algorithm. Step S705 is calculating intrinsic parameters of the image capturing element 210 and distortion coefficients of the image capturing element 210 by the processor 13 according to the first orientation actual image 501, the second orientation actual image 502 and the third orientation actual image 503 and formulas 1-5 described below.

$$s\begin{bmatrix}X\\Y\\1\end{bmatrix}=\begin{bmatrix}\alpha & \gamma & u_0\\0 & \beta & v_0\\0 & 0 & 1\end{bmatrix}[r_1 \mid r_2 \mid r_3 \mid t]\begin{bmatrix}x\\y\\1\end{bmatrix} \quad \text{(formula 1)}$$

$$x_{dr}=x(1+k_1r^2+k_2r^4+k_3r^6) \quad \text{(formula 2)}$$

$$y_{dr}=y(1+k_1r^2+k_2r^4+k_3r^6) \quad \text{(formula 3)}$$

$$x_{dt}=x+[2p_1xy+p_2(r^2+2x^2)] \quad \text{(formula 4)}$$

$$y_{dt}=y+[p_1(r^2+2y^2)+2p_2xy] \quad \text{(formula 5)}$$

(x, y) is a two-dimensional coordinate of World Coordinate System assigned by a user, (X, Y) is a two-dimensional coordinate of a point in a planar image corresponding to (x, y). $\alpha \cdot \beta \cdot \gamma \cdot u_0 \cdot v_0$ are intrinsic parameters of the image capturing element 210, a 3*4 matrix composed of $r_1 \cdot r_2 \cdot r_3 \cdot t$ is regarded as extrinsic parameters between the image capturing element 210 and the projection element 220. $(x_{dr}, y_{dr})$ is a two-dimensional coordinate of a pixel in a planer image with performing a radial distortion algorithm, $k_1 \cdot k_2 \cdot k_3$ are radial distortion coefficients. $r^2=x^2+y^2$. $(x_{dt}, y_{dt})$ is a two-dimensional coordinate of a pixel in a planer image with performing a tangential distortion algorithm, $p_1$ and $p_2$ are tangential distortion coefficients.

Step S706 is enabling the projection function of the structured-light depth camera 200, and projecting a projection pattern onto the surface planes 111. Step S707 is photographing the surface planes 111 by the image capturing element 210 to capture a second image 600. The second image 600 has closed patterns and the projection pattern, and the second image 600 may include a first orientation projection image 601, s second orientation projection image 602, and a third orientation projection image 603 and the first to third orientation projection images 601, 602 and 603 have different orientations respectively. When the first image 500 and the second image 600 are captured by the image capturing element 210, a positional relationship between the structured-light depth camera 200 and the calibration board assembly 11 remains unchanged. Because the processor 13 has not performed an undistortion algorithm, the annular patterns and the projection pattern displayed in the first to third orientation projection images 601, 602 and 603 are distorted or deformed relatively to the actual annular patterns and projection pattern displayed in the calibration boards 110.

Step S708 is cropping the second image 600 by the processor 13 according to the image boundary.

Step S709 is performing the undistortion algorithm for the cropped first image 500 and the cropped second image 600 by the processor 13 so as to generate an undistorted first image and an undistorted second image, wherein the undistorted first image includes an undistorted first orientation actual image, an undistorted second orientation actual image, and an undistorted third orientation actual image, and the undistorted second image includes another one undistorted first orientation actual image, another one undistorted second orientation actual image, and another one undistorted third orientation actual image.

Figure 9:
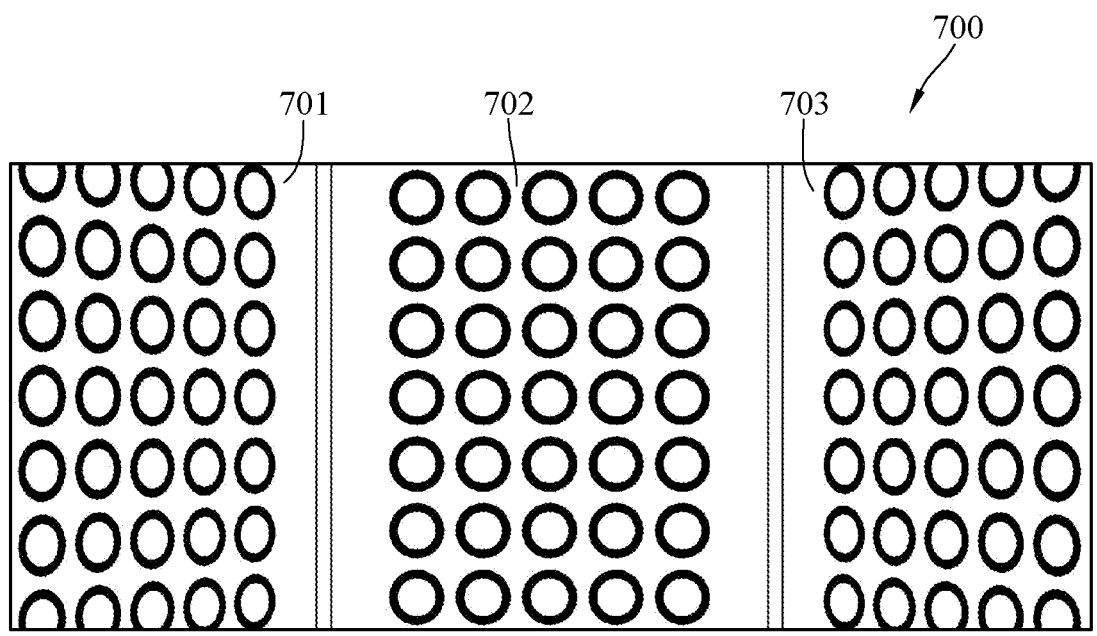
FIG. 9 is a schematic view of an image of a surface plane photographed by a structured-light depth camera with performing an undistortion algorithm according to one embodiment of the present disclosure.

FIG. 9 is a schematic view of an image of surface planes photographed by a structured-light depth camera with performing an undistortion algorithm according to one embodiment of the present disclosure. As shown in FIG. 9, an undistorted first image 700 includes an undistorted first orientation actual image 701, an undistorted second orientation actual image 702, and an undistorted third orientation actual image 703. Comparing the undistorted first image 700 with the first image 500 shown in FIG. 8A, annular patterns of the undistorted first image 700 shown in FIG. 9 are approximately similar to the actual annular patterns of the calibration boards 110.

In Step S710, the processor 13 calculates a first corresponding point coordinate set, a second corresponding point coordinate set and a third corresponding point coordinate set which correspond to the characteristic points of the surface planes 111 in the projection pattern by using a template matching algorithm based on the projection pattern, the undistorted first image, and the undistorted second image. In details, a positional relationship between the structured-light depth camera 200 and the calibration board assembly 11 remains unchanged when the image capturing element 210 captures the first orientation actual image 501 and the first orientation projection image 601, and the processor 13 uses the template matching algorithm to compare the projection pattern with the undistorted first orientation projection image to obtain the first corresponding point coordinate set which corresponds to the characteristic points of the surface planes 111 in the projection pattern. The positional relationship between the structured-light depth camera 200 and the calibration board assembly 11 remains unchanged when the image capturing element 210 captures the second orientation actual image 502 and the second orientation projection image 602, and the processor 13 uses the template matching algorithm to compare the projection pattern with the undistorted second orientation projection image to obtain the second corresponding point coordinate set which corresponds to the characteristic points of the surface planes 111 in the projection pattern. The positional relationship between the structured-light depth camera 200 and the calibration board assembly 11 remains unchanged when the image capturing element 210 captures the third orientation actual image 503 and the third orientation projection image 603, and the processor 13 uses the template matching algorithm to compare the projection pattern with the undistorted third orientation projection image to obtain the third corresponding point coordinate set which corresponds to the characteristic points of the surface planes 111 in the projection pattern.

Step S711 is calculating intrinsic parameters of the projection element 220 and distortion coefficients of the projection element 220 by the processor 13 according to the characteristic point coordinate of each of the characteristic points, the first corresponding point coordinate set, the second corresponding point coordinate set and the third corresponding point coordinate set.

Step S712 is calculating extrinsic parameters between the image capturing element 210 and the projection element 220 by the processor 13 according to the characteristic point coordinates, the image coordinates of the characteristic points, the first corresponding point coordinate set, the second corresponding point coordinate set, the third corresponding point coordinate set, the intrinsic parameters of the image capturing element 210 and the intrinsic parameters of the projection element 220.

Figure 10:
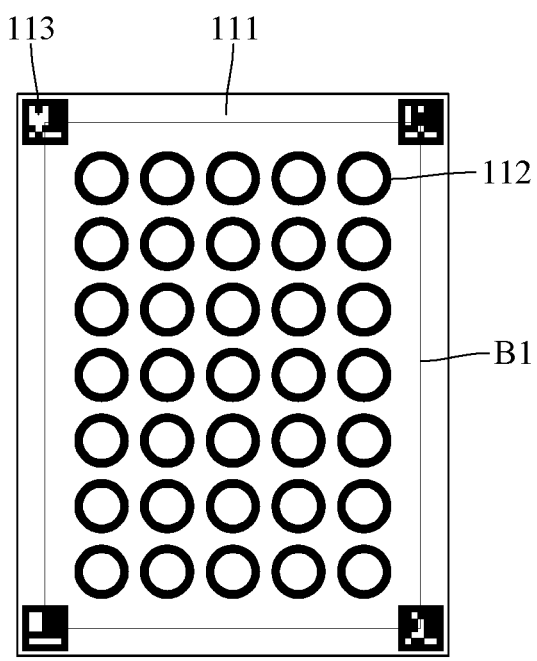
FIG. 10 is a schematic view of defining an image boundary for a surface plane according to one embodiment of the present disclosure.

FIG. 10 is a schematic view of defining an image boundary for a surface plane according to one embodiment of the present disclosure. As shown in FIG. 10, the processor 13 defines an image boundary B1 for each of the surface planes 111 according to marks 113 which are disposed at four corners of each of the surface planes 111 respectively. And then the processor 13 crops the first image 500 and the second image 600 according to the image boundary B1.

Figure 11A:
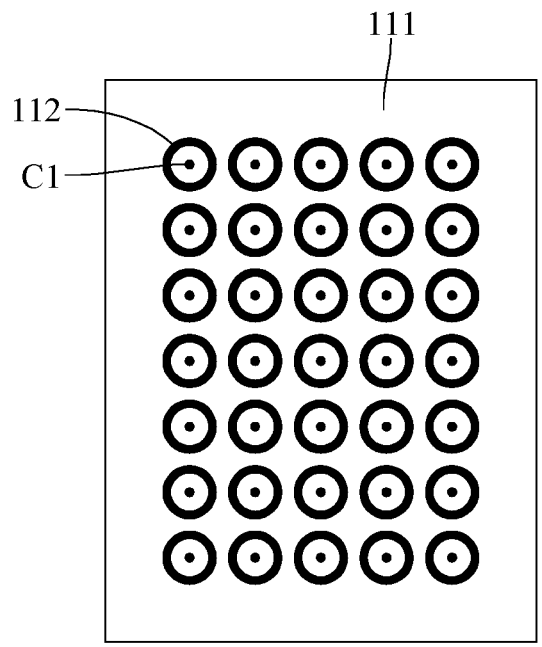
FIGS. 11A to 11C are schematic views of defining an image boundary for a surface plane according to another embodiment of the present disclosure.
Figure 11B:
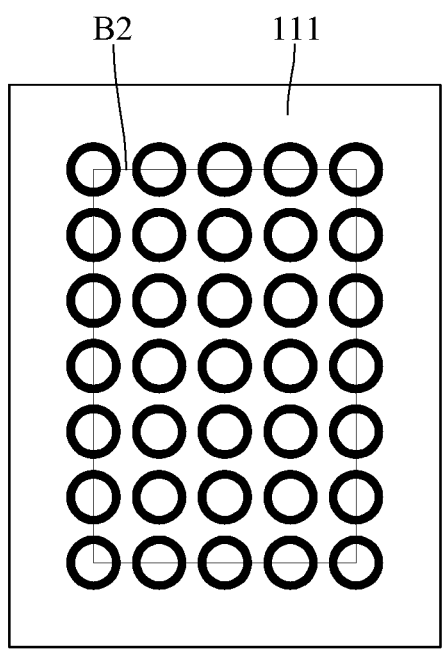
Figure 11C:
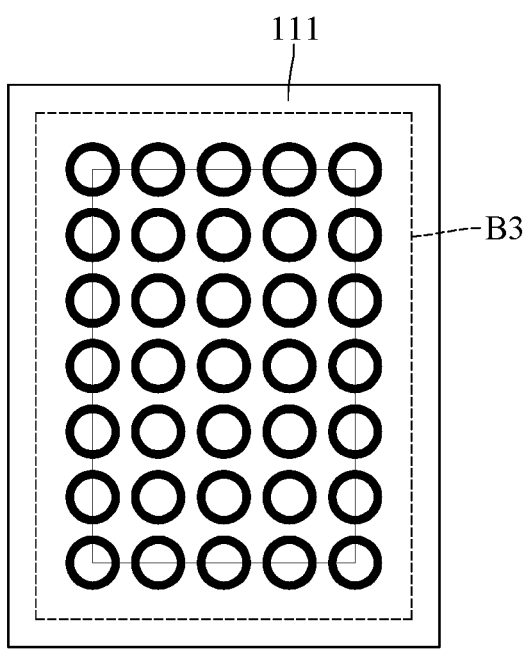

FIGS. 11A to 11C are schematic views of defining an image boundary for a surface plane according to another embodiment of the present disclosure. As shown in FIG. 11A, the processor 13 finds a characteristic point cluster of each of the surface planes 111 by an automatic clustering algorithm, wherein the characteristic point cluster includes centers of mass C1 of all the closed patterns 112. As shown in FIG. 11B, the processor 13 finds a characteristic point clustering boundary B2 according to the characteristic point cluster. As shown in FIG. 11C, the processor 13 expands the characteristic point clustering boundary B2 to generate an image boundary B3. And then the processor 13 crops the first image 500 and the second image 600 according to the image boundary B3.

Figure 12:
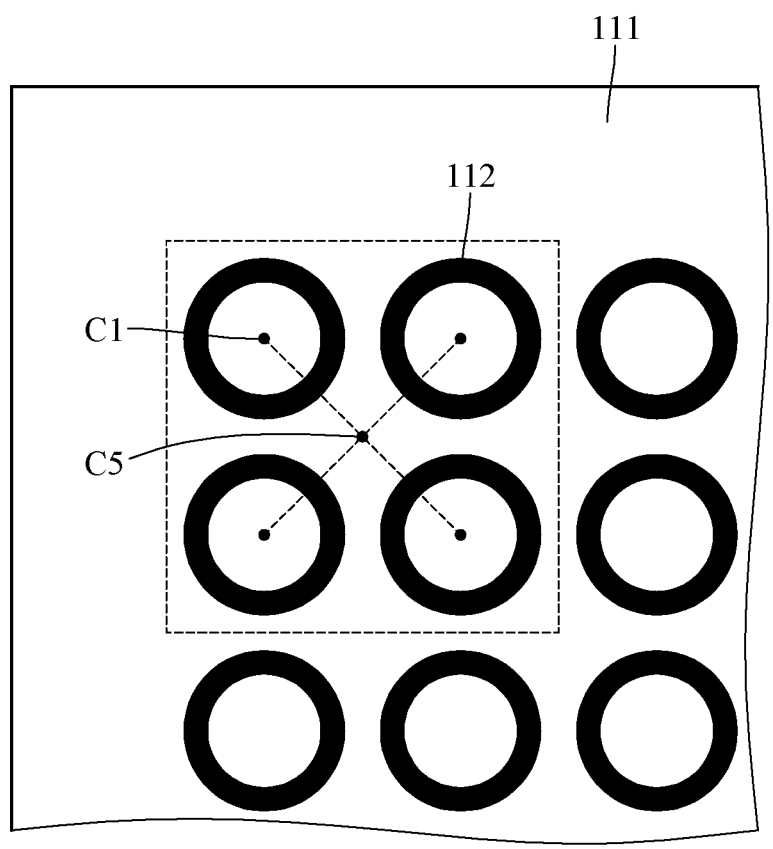
FIG. 12 is a schematic view of defining a characteristic point of a surface plane according to another embodiment of the present disclosure.

FIG. 12 is a schematic view of defining a characteristic point of a surface plane according to another embodiment of the present disclosure. As shown in FIG. 12, except the centers of mass C1 of the closed patterns 112 of the surface plane 111, a center of mass C5 of every four closed patterns can be defined as an additional characteristic point, thereby increasing the number of the characteristic points of the surface plane 111. When the number of the characteristic points is increased, the processor 13 can calculate the intrinsic parameters of the imaging capturing element 210, the intrinsic parameters of the projection element 220, and the extrinsic parameters more accurately for improving the calibration quality.

Figure 13:
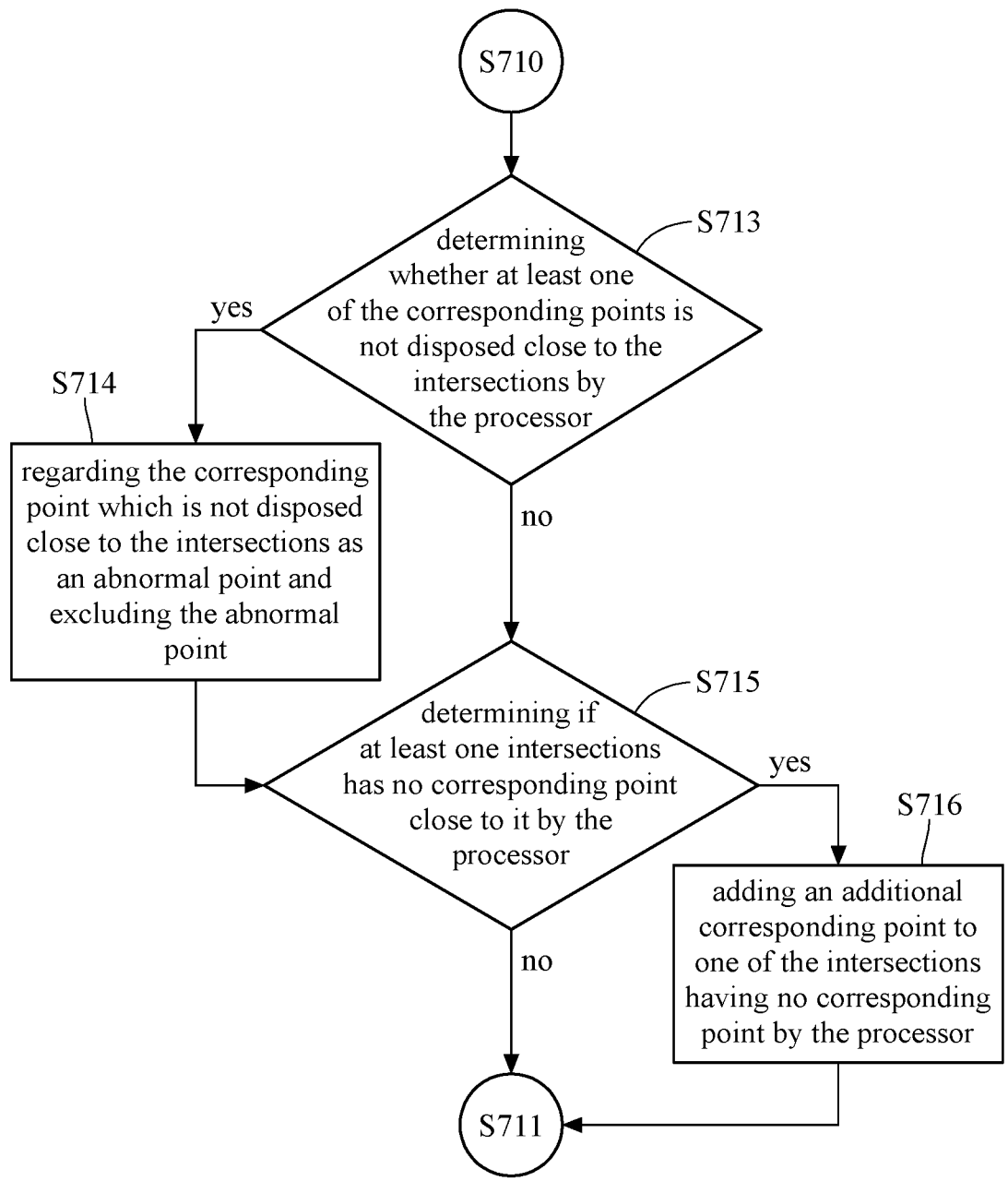
FIG. 13 is a flowchart of a depth camera calibration method according to another embodiment of the present disclosure.

FIG. 13 is a flowchart of a depth camera calibration method according to another embodiment of the present disclosure. Comparing the depth camera calibration method of FIG. 13 with the depth camera calibration method of FIG. 7, the depth camera calibration method of FIG. 13 further comprises Step S713, Step S714, Step S715, and Step S716 between Step S710 and Step S711. Step S713 comprises obtaining a plurality of longitudinal reference lines and a plurality of horizontal reference lines by the processor 13 according to a plurality of corresponding points in the second image 600, generating a plurality of intersections according to the horizontal reference lines and the longitudinal reference lines, and determining whether at least one of the corresponding points is not disposed close to the intersections by the processor 13. If the processor 13 determines at least one of the corresponding points is not disposed close to the intersections, Step S714 is then performed. Alternatively, Step S715 is performed if the processor 13 determines all the corresponding points are disposed close to the intersections. Step S714 is regarding the corresponding point which is not disposed close to the intersections as an abnormal point and excluding the abnormal point by the processor 13. Step S715 is determining if at least one of the intersections has no corresponding point close to it by the processor 13. If the processor 13 determines at least one of the intersections has no corresponding point close to it, Step S716 is then performed. If the processor 13 determines all of the intersections have corresponding points respectively, Step S711 is then performed. Step S716 is adding an additional corresponding point to one of the intersections having no corresponding point by the processor 13. In other embodiments, the performed sequence of Step S713 and the performed sequence of Step S715 can be reversed.

Figure 14A:
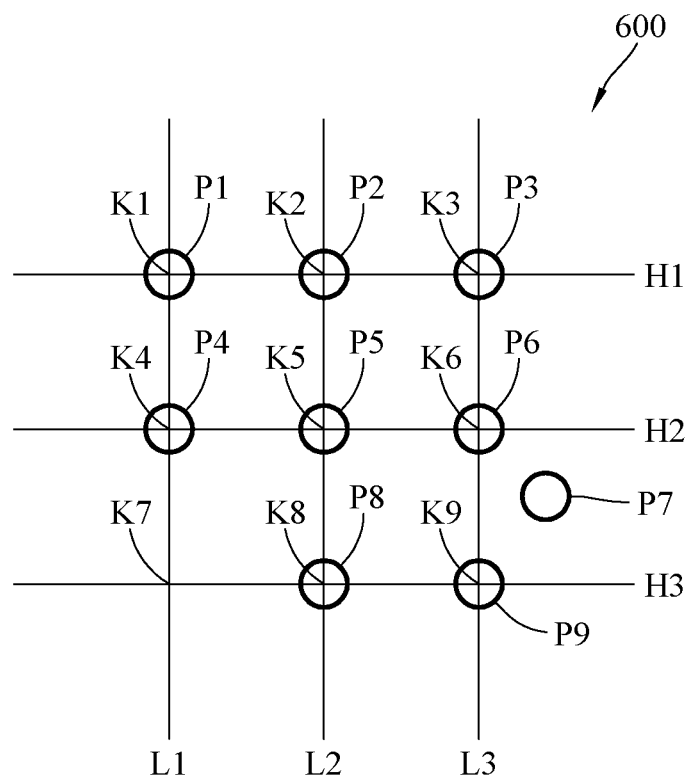
FIGS. 14A to 14B are schematic views of deleting an abnormal point of an image by a processor according to one embodiment of the present disclosure.
Figure 14B:
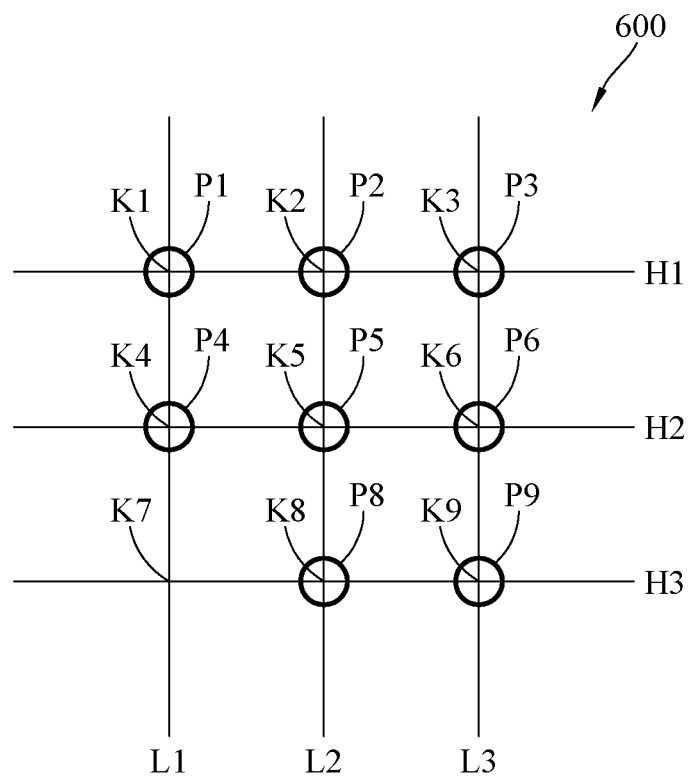

FIGS. 14A to 14B are schematic views of deleting an abnormal point of the second image by a processor according to one embodiment of the present disclosure. As shown in FIG. 14A and FIG. 14B, a plurality of longitudinal reference lines L1~L3 and a plurality of horizontal reference lines H1~H3 are generated by a plurality of corresponding points P1~P9 in the second image 600, and a plurality of intersections K1~K9 are generated by the longitudinal reference lines L1~L3 and the horizontal reference lines H1~H3. The processor 13 regards the corresponding point which is not disposed close to any one of the intersections as an abnormal point when the processor 13 determines one of the corresponding points P1~P9 is not disposed close to any one of the intersections K1~K9. In this embodiment, the corresponding point P7 is not disposed at any one of the intersections K1~K9, so the processor 13 regards the corresponding point P7 as an abnormal point and excludes the corresponding point P7 of the second image 600.

Figure 15A:
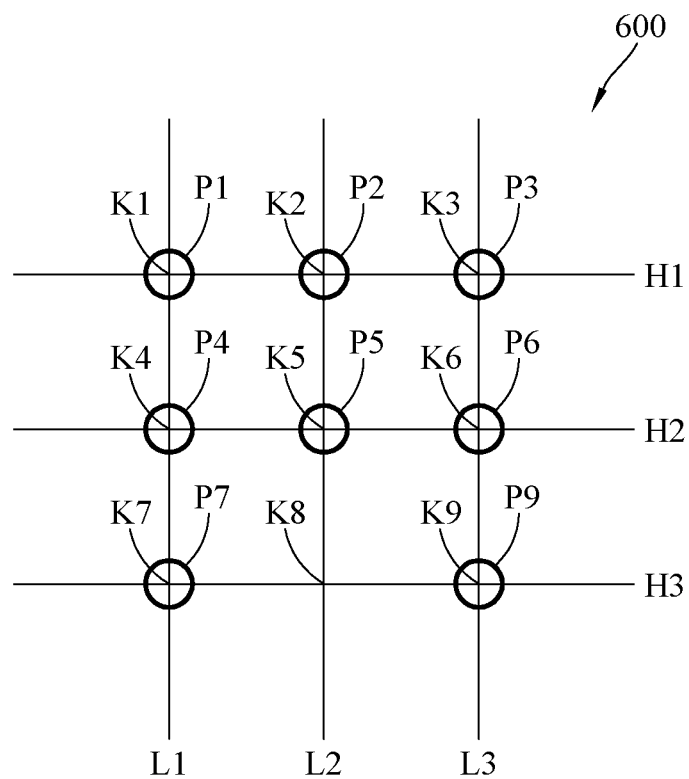
FIGS. 15A to 15B are schematic views of adding an additional corresponding point to an image by a processor according to one embodiment of the present disclosure.
Figure 15B:
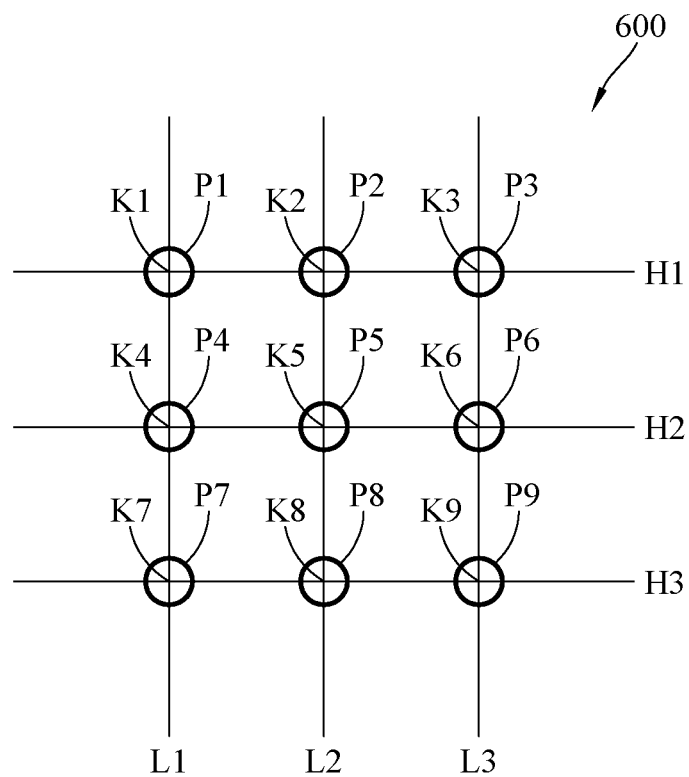

FIGS. 15A to 15B are schematic views of adding an additional corresponding point to the second image by a processor according to one embodiment of the present disclosure. As shown in FIG. 15A and FIG. 15B, the processor 13 adds an additional corresponding point to an intersection at which no corresponding point is disposed when the processor 13 determines one of the intersections K1~K9 has no corresponding point. In this embodiment, the intersection K8 of the second image lacks a corresponding point which corresponds to a characteristic point of the surface plane 111, so the processor 13 adds an additional corresponding point P8 to the intersection K8.

Moreover, the methods for cropping an image boundary mentioned in FIG. 10 and FIGS. 11A to 11C can be used when the second image does not lack any one corresponding point, and the methods for cropping an image boundary also can be used when the second image lacks at least one corresponding point. However, the methods for cropping an image boundary have better performances when the second image does not lack any one corresponding point.

In view of the above description, it does not need to change the positional relationship between the structured-light depth camera and the calibration board assembly when the structured-light depth camera is calibrated by the depth camera calibration method. Comparing the depth camera calibration method of our disclosure with conventional calibration methods, it is necessary to change the positional relationship between the structured-light depth camera and the calibration board when the structured-light depth camera is calibrated by the conventional depth camera calibration method, so the calibration time is greatly shortened by using the depth camera calibration method of our disclosure. Furthermore, the characteristic point using for calibration is a center of mass of the closed pattern. Characteristic points of a grid-like pattern are located at intersections of lines respectively. Comparing the characteristic points of said grid-like pattern with the characteristic point of the closed pattern, the contour of the closed pattern can be established by using thick and obvious lines, so the closed pattern has a higher recognition. On the other hand, since the processor crops the image, excludes the abnormal point, and adds the additional corresponding point before it calculates the parameters of the structured-light depth camera, so the calculated parameters of the structured-light depth camera should have higher calibration qualities.

It will be apparent to those skilled in the art that various modifications and variations can be made to the disclosed embodiments. It is intended that the specification and examples be considered as exemplary only, with a true scope of the disclosure being indicated by the following claims and their equivalents.

What is claimed is:

1. A depth camera calibration device, configured to calibrate a structured-light depth camera, and the depth camera calibration device comprising:
  a calibration board assembly including a plurality of surface planes, with each of the surface planes having a plurality of closed patterns, with each of the closed patterns comprising an inner contour and an outer contour, a center of mass of each of the closed pattern being within a range enclosed by the inner contour, the surface planes being non-coplanar and non-parallel to each other, and the surface planes configured to receive a projection pattern projected by the structured-light depth camera, wherein a positional relationship between the structured-light depth camera and the calibration board assembly remains unchanged; and
  a processor, configured to electrically connected to the structured-light depth camera, obtains an intrinsic parameters set, a distortion coefficients set and extrinsic parameters of the structured-light depth camera by cropping an image boundary automatically, calculating a plurality of positions of characteristic points, reading the projection pattern, calculating a plurality of positions of corresponding points and excluding abnormal points.

2. The depth camera calibration device in claim 1, wherein the closed patterns are annular patterns or regular polygon shaped patterns.

3. The depth camera calibration device in claim 1, wherein the centers of mass of the closed patterns are the characteristic points of the plurality of surface planes respectively.

4. The depth camera calibration device in claim 1, wherein an angle between any two of the plurality of surface planes is not 0 degree or 180 degrees.

5. The depth camera calibration device in claim 1, wherein the calibration board assembly is a one-piece structure.

6. The depth camera calibration device in claim 1, wherein the calibration board assembly includes a plurality of calibration boards, the plurality of calibration boards are spaced with each other, and the plurality of surface planes are disposed at the plurality of calibration boards respectively.

7. The depth camera calibration device in claim 1, wherein the plurality of surface planes has different orientations relative to an image capturing surface of the structured-light depth camera respectively.

8. A depth camera calibration method, configured to calibrate a structured-light depth camera and performed by a depth camera calibration device, the depth camera calibration device comprising a calibration board assembly and a processor, the calibration board assembly including a plurality of surface planes, with each of the plurality of surface planes having a plurality of closed patterns, with each of the closed patterns comprising an inner contour and an outer contour, a center of mass of each of the plurality of closed patterns being in a range enclosed by the inner contour, the surface planes being non-coplanar and non-parallel to each other, and the depth camera calibration method comprising:
  disabling a projection function of the structured-light depth camera and photographing the plurality of surface planes to obtain a first image by an image capturing element of the structured-light depth camera, with the first image having the plurality of closed patterns;
  enabling the projection function of the structured-light depth camera and photographing the plurality of surface planes to obtain a second image by the image capture element, with the second image having the plurality of closed patterns and a projection pattern, and a positional relationship between the structured-light depth camera and the calibration board assembly remaining unchanged when the image capturing element obtains the first image and the second image; and
  obtaining an intrinsic parameters set, a distortion coefficients set and extrinsic parameters of the structured-light depth camera by cropping an image boundary automatically, calculating a plurality of positions of characteristic points, reading the projection pattern, calculating a plurality of positions of corresponding points and excluding an abnormal point according to the first image and the second image by the processor.

9. The depth camera calibration method in claim 8, wherein calculating the plurality of positions of characteristic points includes: calculating the centers of mass as a plurality of characteristic points of the plurality of surface planes according to the first image; and obtaining a plurality of corresponding points in the projection pattern according to the first and second images, wherein the plurality of corresponding points correspond to the plurality of characteristic points respectively.

10. The depth camera calibration method in claim 8, wherein excluding the abnormal point includes: obtaining a plurality of longitudinal reference lines and a plurality of horizontal reference lines according to the plurality of corresponding points; generating a plurality of intersections according to the plurality of horizontal reference lines and the plurality of longitudinal reference lines; and regarding the corresponding point which is not disposed close to the plurality of intersections as the abnormal point and excluding the abnormal point when the processor determines that one of the plurality of corresponding points is not disposed close to any one of the plurality of intersections.

11. The depth camera calibration method in claim 8, further comprising:

obtaining a plurality of longitudinal reference lines and a plurality of horizontal reference lines by the processor according to the plurality of corresponding points;

generating a plurality of intersections according to the plurality of horizontal reference lines and the plurality of longitudinal reference lines; and adding an additional corresponding point to one of the plurality of intersections which has no corresponding point by the processor when the processor determines that one of the plurality of intersections has no corresponding point.

12. The depth camera calibration method in claim 8, wherein cropping the image boundary automatically includes: disposing marks on corners of each of the plurality of surface planes respectively to define the image boundary of each of the plurality of surface planes; and cropping the first image and the second image according to the image boundary by the processor.

13. The depth camera calibration method in claim 8, wherein cropping the image boundary automatically includes: finding a characteristic point cluster and a characteristic point clustering boundary from each of the plurality of surface planes by an automatic clustering algorithm; expanding the characteristic point clustering boundary to generate the image boundary; and cropping the first image and the second image according to the image boundary by the processor.

* * * * *